ALLOPOLAR CYANINE DYES DERIVED FROM 2,4-CHROMANDIONE OR 3H-NAPHTHO[2,1-b] PYRAN-1,3(2H)-DIONE

John Victor Holtzclaw and Leslie G. S. Brooker, Rochester, N.Y., assignors to Eastman Kodak Company, Rochester, N.Y., a corporation of New Jersey
No Drawing. Original application Dec. 22, 1966, Ser. No. 603,786, now Patent No. 3,440,053, dated Apr. 22, 1969. Divided and this application Oct. 29, 1968, Ser. No. 798,516
Int. Cl. C07d 7/18
U.S. Cl. 260—240.4       2 Claims

ABSTRACT OF THE DISCLOSURE

Allopolar cyanine dyes are derived from 2,4-chromandione or 3H-naphtho[2,1-b]pyran-1,3(2H)-dione. Photographic emulsions are provided containing such dyes. Novel merocyanine dye intermediates are provided for the preparation of the subject allopolar cyanine dyes. The allopolar dyes are prepared by condensing the merocyanine dye intermediates with a quaternary salt. The allopolar dyes are useful spectral sensitizers for photographic silver halide emulsions.

---

The present application is a division of our application Ser. No. 603,786 filed Dec. 22, 1966, now U.S. Pat. 3,440,053 issued Apr. 22, 1969.

This invention relates to novel and improved photographic materials, and more particularly to a new class of allopolar cyanine dyes derived from 2,4-chromandione and 3H-naphtho[2,1-b]pyran-1,3(2H)-dione, to novel photographic silver halide emulsions and elements prepared therewith, and to the preparation of these dyes and photographic materials.

It is well known that cyanine dyes extend the sensitivity of photographic silver halide emulsions. However, this class includes whole groups of dye compounds which have no sensitizing ability or which even have a desensitizing effect. The numbers of sensitizers of this class which can be used in practice is further limited by the strict requirements that a really useful sensitizer must meet, when incorporated into silver halide emulsion layers. For example, the clearness of the layers and images produced therein must not be reduced by the presence of the sensitizer, and stability on storage, particularly as regards freedom from fogging and degree of sensitization, must be maintained. Furthermore, the gradation in both the fresh and in the aged condition must remain unchanged at the required value. These requirements are especially applicable to sensitizers for color photographic processes, which sensitizers in addition need to have a particularly high sensitizing action and also a special selectivity.

We have now found that allopolar cyanine dyes containing a 2,4-chromandione nucleus or the related 3H-naphtho[2,1-b]pyran-1,3(2H)-dione nucleus attached to the polymethine chain meet all the above mentioned requirements, thus providing a new class of excellent spectral sensitizers for use in both black and white and color photographic materials and processes. They are also useful as components in certain supersensitizing combinations.

It is, therefore, an object of our invention to provide a new class of allopolar cyanine dyes that are useful spectral sensitizers for photographic silver halide emuslions.

Another object is to provide novel photographic silver halide emulsions containing therein at least one of the new dyes of the invention, and novel photographic elements prepared therewith.

A further object is to provide means for preparing the new dyes and photographic materials of the invention.

Other objects of the invention will become apparent from a consideration of the general description, the examples, and the appended claims.

The new class of allopolar cyanine dyes of the invention can be represented by the following general formula:

I.

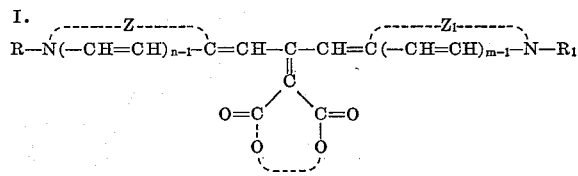

wherein $n$ and $m$ each represents a positive integer of from 1 to 2, R and $R_1$ each represents a substituent independently selected from the group consisting of an alkyl substituent, including substituted alkyl, such as methyl, ethyl, propyl, butyl, hexyl, decyl, dodecyl, hydroxalkyl, e.g., $\beta$-hydroxyethyl, $\gamma$-hydroxypropyl, sulfoalkyl, e.g., $\beta$-sulfoethyl, $\omega$-sulfobutyl, etc., sulfatoalkyl, e.g., $\beta$-sulfatoethyl, $\omega$-sulfatobutyl, etc., carboxyalkyl, e.g., $\beta$-carboxyethyl $\omega$-carboxybutyl, etc., alkoxyalkyl, e.g., $\beta$-methoxyethyl, $\mu$-ethoxypropyl, $\omega$-butoxybutyl, etc., acyloxyalkyl, e.g., $\beta$-acetoxyethyl, $\omega$-propionyloxybutyl, etc., alkoxycarbonylalkyl, e.g., $\beta$-methoxycarbonylethyl, $\omega$-butoxycarbonylbutyl, etc., alkaryl, e.g., benzyl, $\beta$-phenylethyl, said alkyl substituent preferably containing from 1 to 4 carbon atoms; an aryl substituent, e.g., phenyl, tolyl, chlorophenyl, sulfophenyl, carboxyphenyl, etc.; and, alkenyl substituents, e.g., allyl, 1-propenyl, 2-propenyl, 1-butenyl, 3-butenyl, etc.; Q represents the non-metallic atoms necessary to complete a heterocyclic nucleus selected from the group consisting of a 2,4-chromandione nucleus and 3H-naphtho[2,1-b] pyran-1,3-(2H)-dione nucleus; Z and $Z_1$ each represents the non-metallic atoms required to complete a heterocyclic nucleus containing from 5 to 6 atoms in the heterocyclic ring, which ring includes, in addition to the hetero nitrogen atom, a second hetero atom selected from oxygen, sulfur and selenium, such as a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc., a benzothiazole nucleus, e.g., benzothiazole, 4-chlorobenzothiazole, 5-chlorobenzothiazole, 6-chlorobenzothiazole, 7-chlorobenzothiazole, 4-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc., a thiazolo[4,5-b]quinoline nucleus, e.g., 3-ethyl-thiazolo[4,5-b] quinoline, etc., a thianaphtheno-7',6'-4,5-thiazole nucleus, e.g., 4-methoxythianaphtheno-7',6'-4,5-thiazole, etc.); an oxazole nucleus, (e.g., 4-methyloxazole, 5-methyloxazole, 4-phenyloxazole, 4,5-diphenyloxazole, 4-ethyloxazole, 4,5-dimethyloxazole, 5-phenyloxazole, etc., a benzoxazole nucleus, e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 6-chlorobenzoxazole, 6-methoxybenzoxazole, 5-hydroxybenzoxazole, 6-hydroxybenzoxazole, etc., a naphthoxazole nucleus, e.g., $\alpha$-naphthoxazole, $\beta,\beta$-naphthoxazole, $\beta$-naphthoxazole, etc.); a selenazole nucleus (e.g., 4-methylselenazole, 4-phenylselenazole, etc., a benzoselenazole nucleus, e.g., benzoselenazole, 5-chloroselenazole, 5-methoxybenzoselenazole, 5-hydroxybenzoselenazole, tetrahydrobenzoselenazole, etc., a naphthoselenazole nucleus, e.g., $\alpha$-naphthoselenazole, $\beta,\beta$-naphthoselenazole, $\beta$-naphthoselenazole, etc.); and, a thiazoline nucleus (e.g., thiazoline, 4-methylthiazoline, etc.); and the like nuclei.

The above defined new allopolar cycanine dyes of the invention can be conveniently prepared by condensing a merocyanine dye compound of the general formula:

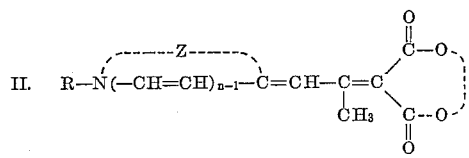

wherein $n$, R, Q and Z are as previously defined with a quaternary salt, containing a reactive alkylthio group, of the general formula:

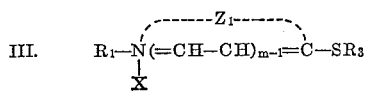

wherein $m$, $R_1$ and $Z_1$ are as previously defined, $R_1$ represents a lower alkyl group containing from 1 to 4 carbon atoms, e.g., methyl, ethyl, propyl, isopropyl, butyl, etc., and X represents an acid anion, e.g., chloride, bromide, iodide, thiocyanate, sulfamate, perchlorate, p-toluenesulfonate, methyl sulfate, ethyl sulfate, etc., in an inert solvent medium, e.g., acetic anhydride, at elevated temperatures and preferably at refluxing temperatures of the reaction mixture, in the presence of a basic condensing agent such as a trialkylamine, e.g., triethylamine, tri-n-propylamine, etc., N-methylpiperidine, N-ethylpiperidine, N,N-dimethylaniline, etc. The dye products are then separated from the reaction mixtures by chilling and purified, when necessary, by one or more recrystallizations from suitable solvents such as pyridine, methanol, m-cresol, etc., and mixtures of such solvents.

The following examples further illustrate the invention.

EXAMPLE 1

3-{bis[(3-ethyl-2-benzothiazolinylidene)methyl]methylene}-2,4-chromandione

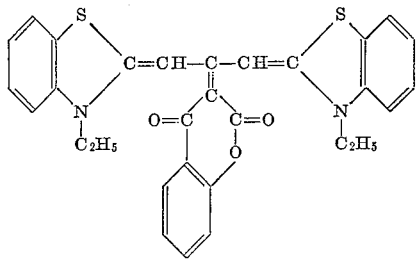

3-[(3 - ethyl-2-benzothiazolinylidene) - 1 - methylethylidene]-2,4-chromandione (1.80 g., 0.005 mole), 3-ethyl-2-ethylthiobenzothiazolium ethosulfate (1.75 g., 0.005 mole), acetic anhydride (10 ml.) and triethylamine (5 ml.) were mixed together and with good stirring heated at refluxing temperature for ten minutes and then quickly chilled. The crude dye which separated from solution was removed by filtration and dissolved in methanol. The solution was concentrated until crystallization began and then chilled. The dye which precipitated from the solution was removed by filtration, washed with methanol and dried. The yield of dye was 0.25 g. which was 9% of theory.

The dye was purified by dissolving it in a minimum quantity of hot pyridine, filtering the solution, and diluting the filtrate with four volumes of methanol. The yield of dye after this recrystallization was 0.15 g. (5%), M.P. 303–304° C. dec.

In place of the 3-[(3-ethyl-2-benzothiazolylidene)-1-methylethylidene]-2,4-chromandione in the above example, there can be substituted an equivalent amount of any other appropriate merocyanine dye intermediates defined by Formula II above such as 3-[(3-ethyl-2-benz- oxazolinylidene)-1-methylethylidene] - 2,4-chromandione, or 3-[(3-ethyl-2-benzoselenazolinylidene)-1-methylethylidene]-2,4-chromandione, or 3 - [(3-ethyl-2-thiazolinylidene)-1-methylethylidene] - 2,4 - chromandione, and the like, to give the corresponding allopolar cyanine dyes having generally similar spectral sensitizing properties when incorporated into photographic silver halide emulsions. It will be apparent that the 3-ethyl-2-ethylthiobenzolium ethosulfate in the above example can also be replaced with equivalent amounts of any other appropriate intermediates defined by Formula III above to give the corresponding sensitizers.

EXAMPLE 2

3-{bis[(1-ethylnaphtho[1,2-d]thiazolin-2-ylidene)methyl]methylene}-2,4-chromandione

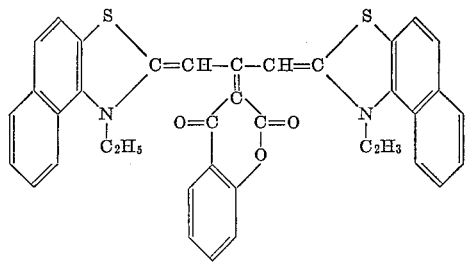

3-[(1-ethylnaphtho[1,2-d]thiazolin - 2 - ylidene)-1-methylethylidene]-2,4-chromandione (4.1 g., 0.01 mole), 1-ethyl-2-methylthionaphtho[1,2-d]thiazolium p-toluenesulfonate (4.3 g., 0.01 mole), acetic anhydride (20 ml.) and triethylamine (5 ml.) were mixed together and heated at refluxing temperature for 25 minutes. After chilling, the solid dye which separated was removed by filtration and dried. The yield of crude dye was 2.8 g. which was 45% of theory.

The dye was purified by dissolving it in a minimum quantity of m-cresol at 110° C., filtering the solution and diluting the filtrate with five volumes of methanol. The yield after two such recrystallizations was 1.0 g. (16%), M.P. 327–328° C. dec.

The dye intermediate 3-[(1-ethylnaphtho[1,2-d]thiazolin-2-ylidene)-1-methylethylidene] - 2,4-chromandione in the above example can be substituted by an equivalent amount of any other appropriate merocyanine dye intermediate coming under Formula II above such as a 3-[(-1-alkylnaphtho[2,1-d]thiazolin - 2 - ylidene)-1-methylethylidene]-2,4-chromandione to give the corresponding allopolar cyanine dyes having generally similar properties as spectral sensitizers for photographic silver halide emulsions.

EXAMPLE 3

3-{bis[(3-ethyl-2(3H)-thiazolo[4,5-b]quinolylidene)methyl]methylene}-2,4-chromandione

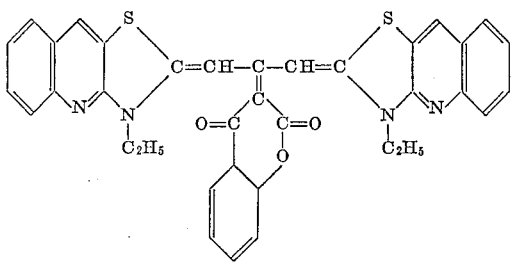

3 - [(3-ethyl - 2(3H)thiazolo[4,5-b]quinolylidene)-1-methylethylidene] - 2,4 - chromanidone (0.41 g., 0.001 mole), 3 - ethyl-2-methylthiothiazolo[4,5-b]quinolinium p-toluenesulfonate (0.44 g., 0.001 mole), acetic anhydride (5 ml.) and triethylamine (2 ml.) were mixed together and heated with good stirring at refluxing temperature for 10 minutes. After chilling, the solid dye was removed by filtration, washed with ethyl alcohol and dried. The yield of crude dye was 0.42 g. which was 67% of theory.

The dye was purified by dissolving it in a minimum quantity of hot pyridine, filtering the solution and diluting the filtrate with four volumes of methanol. The yield after two such recrystallizations was 0.25 g. (40%), M.P. 238–239° C. dec.

EXAMPLE 4

2-{bis[(3-ethyl-2-benzothiazolinylidene)methyl]methylene}-3H-naphtho[2,1-b]pyran-1,3(2H)-dione

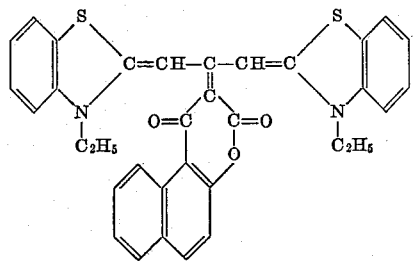

2-[(3-ethyl - 2 - benzothiazolinylidene)-1-methylethylidene]-3H-naphtho[2,1-b]pyran-1,3(2H)-dione (1.03 g., 0.0075 mole), 3-ethyl-2-ethylthiobenzothiazolium ethosulfate (0.87 g., 0.0025 mole), acetic anhydride (6 ml.) and triethylamine (1.5 ml.) were mixed together and heated at refluxing temperature for 20 minutes. After chilling, the solid dye was removed by filtration, washed with methanol and dried. The yield of crude dye was 1.37 g. which was 95% of theory.

The dye was purified by dissolving it in a minimum quantity of hot pyridine, filtering the solution and diluting the filtrate with three volumes of methanol. The yield after two such recrystallizations was 0.65 g. (45%), M.P. 268–269° C. dec.

In place of the 2-[(3-ethyl-2-benzothiazolinylidene)-1-methylethylidene] - 3H - naphtho[2,1-b]pyran - 1,3 (2H)-dione in the above example, there can be substituted an equivalent amount of any other appropriate merocyanine dye intermediate defined by Formula II above such as 2-[(3 - ethyl - 2-benzoxazolinylidene)-1-methylethylidene] - 3H - naphtho[2,1-b]pyran-1,3(2H)-dione, or 2 - [(3 - ethyl - 2 - benzoselenazolinylidene)-1-methylethylidene]-3H - naphtho[2,1-b]pyran - 1,3(2H)-dione, or 2-[(3-ethyl-2-thiazolinylidene) - 1 - methylethylidene] 3H-naphtho[2,1-b]pyran-1,3 - (2H) - dione, and the like, to give the corresponding allopolar cyanine dyes having generally similar spectral sensitizing properties when incorporated into photographic silver halide emulsions.

The above prepared allopolar dyes of the invention were then tested in a silver bromoiodide emulsion containing 0.77 mole percent iodide of the type described by Trivelli and Smith, Phot. Journal, 79, 330 (1939). The dyes, dissolved in suitable solvents, were added to separate portions of the emulsion at the concentrations indicated. After digestion at 52° C. for 10 minutes, the emulsions were coated at a coverage of 432 mg. of silver per square foot on a cellulose acetate film support. A sample of each coating was exposed on an Eastman IB sensitometer and to a wedge spectrograph, for a period of ⅕ second to a tungsten light source; through an appropriate filter which transmits substantially no light of wavelengths shorter than about 495 m$\mu$, i.e., a filter which excludes blue light. The exposed coatings were then processed in a developer having the following composition:

| | Grams |
|---|---|
| N-methyl-p-aminophenosulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter. | | and then fixed in a conventional sodium thiosulfate fixing bath, washed and dried. Densitometric measurements were then made of the developed images of each coating. The sensitizing values obtained and the relative speeds are shown in the following Table 1. The relative speeds were calculated, based on an arbitrary relative speed of 100 for the coatings sensitized with 0.08 g. of the dye of Example 2+1 ml. of pyridine, per mole of silver halide.

Two of the above dyes, those of Example 1 and Example 2, were tested as supersensitizers for a thiacarbocyanine with a chain phenyl substituent which is designated below as Dye A. The sensitizing data and relative speed of Dye A alone and in combination with Example 1 and Example 2 are also given in the table.

Dye A

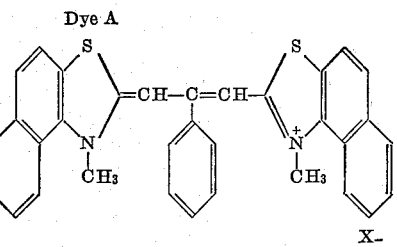

TABLE I

| Dye of example No. | Dye concentration (g./mole silver) | Emulsion type | Sensitizing range (m$\mu$) | Sensitizing Maximum (m$\mu$) | Minus blue exposure relative speed |
|---|---|---|---|---|---|
| 1 | 0.08 | Silver bromoiodide | To 620 | 590 | 13 |
| 2 | 0.08 | do | To 650 | 625 | 5 |
| 3 | 0.08 | do | No. sens | | 0 |
| 4 | 0.08 | do | To 590 | 575 | 1 |
| Dye A | 0.08 | do | To 720 | 680 | 63 |
| 1+1 ml. pyridine | 0.08 | do | To 670 | 630 | 32 |
| 2+1 ml. pyridine | 0.08 | do | To 710 | 650 | 100 |
| 3+1 ml. pyridine | 0.08 | do | To 730 | 695 | 1 |
| 4+1 ml. pyridine | 0.08 | do | To 650 | 600 | 80 |
| Dye A+1 | 0.01 | do | To 730 | 685 | 89 |
| Dye A+2 | 0.01 | do | To 730 | 685 | 200 |

The following examples illustrate the preparation of the merocyanine dye intermediates employed in the procedures of above Examples 1 to 4.

EXAMPLE 5

3-[(3-ethyl-2-benzothiazolinylidene)-1-methylethylidene]-2,4-chromandione

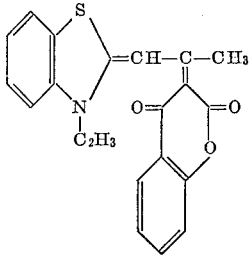

2,4-chromandione (2.40 g., 0.015 mole) was dissolved in ethyl alcohol (40 ml.). To the solution was added triethylamine (3 ml.) to which was then added dropwise, with stirring, over twenty minutes at room temperature, a solution of 2-(2-chloropropenyl)-3-ethylbenzothiazolium chloride (2.40 g., 0.010 mole). Stirring was continued after the addition was complete for sixteen hours. The solid dye which separated was filtered off, washed with ethyl alcohol and dried. Yield 1.7 g. which was 47% of theory.

The dye was purified by recrystallization from ethyl alcohol. Yield 1.4 g., (38%).

EXAMPLE 6

3[(1-ethylnaphtho[1,2-d]thiazolin-2-ylidene)-1-methylethylidene]-2,4-chromandione

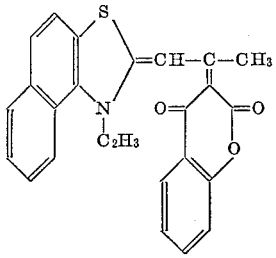

1-ethyl-2-methylnaphtho[1,2-d]thiazolium p-toluenesulfonate (4.00 g., 0.01 mole), 2,4-chromandione (1.62 g., 0.01 mole), triethylorthoacetate (10 ml.) and pyridine (20 ml.) were mixed together and heated at refluxing temperature for one hour. After chilling, the crude dye which had precipitated was filtered off, washed with methanol and dried. The yield was 3.0 g. which was 39% of theory.

The dye was purified by dissolving it in a minimum quantity of hot pyridine, filtering the solution and then diluting the filtrate with two volumes of methanol to reprecipitate the dye. The yield after two such recrystallizations was 0.9 g. (22%), M.P. 237–238° dec.

EXAMPLE 7

3-[(3-ethyl-2(3H)thiazolo[4,5-b]quinolylidene)-1-methylethylidene]-2,4-chromandione

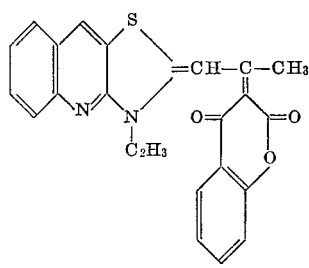

3-ethyl-2-methylthiazolo[4,5-b]quinolinium chloride (2.65 g., 0.01 mole), 2,4-chromandione (1.62 g., 0.01 mole), triethylorthoacetate (5 ml.) were mixed together and heated at refluxing temperature for twenty minutes. After chilling, the crude dye which had precipitated was filtered off, washed with methanol and dried. The yield was 3.34 g. which was 80% of theory.

The dye was purified by dissolving it in a minimum quantity of hot pyridine, filtering the solution and diluting the filtrate with three volumes of methanol to reprecipitate the dye. The yield after two such recrystallizations was 0.58 g. (14%), M.P. 233–234° dec.

EXAMPLE 8

2[(3-ethyl-2-benzothiazolinylidene)-1-methylethylidene]-3H-naphtho[2,1-b]pyran-1,3(2H)-dione

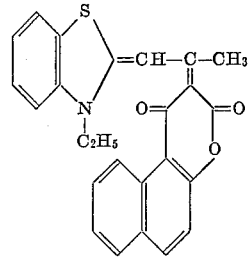

3-ethyl-2-methylbenzothiazolium p-toluenesulfonate (3.50 g., 0.01 mole), 3H-naphtho[2,1-b]pyran-1,3(2H)-dione (2.12 g., 0.01 mole), triethylorthoacetate (10 ml.) and pyridine (15 ml.) were mixed together and heated at refluxing temperature for one hour. After chilling, the crude dye which had precipitated was filtered off and dried. The yield was 2.18 g. which was 53% of theory.

The dye was purified by dissolving it in a minimum quantity of hot pyridine, filtering the solution and diluting the filtrate with three volumes of methanol to reprecipitate the dye. The yield after two such recrystallizations was 0.33 g. (16%), M.P. 216–217° dec.

It will be apparent from the foregoing that other merocyanine dye intermediates defined by Formula II above can be prepared by the procedures described in preceding Examples 5 to 8 by appropriate selection of the quaternary salt reactants. For example, the 2-(2-chloropropenyl)-3-ethylbenzothiazolium chloride of Example 5 can be replaced with an equivalent amount, for example, of 2-(2-chloropropenyl)-3-ethylbenzoxazolium chloride or 2-(2-chloropropenyl)-3-ethylbenzoselenazolium chloride, and the like, to give the corresponding merocyanine dyes containing the 2,4-chromandione nucleus. The quaternary salt reactants of preceding Examples 6, 7 and 8 can be similarly replaced with equivalent amounts of appropriate corresponding benzoxazolium, benzoselenazolium, etc. salts to give other merocyanine dye intermediates such as previously mentioned and as defined by Formula II above.

For the preparation of photographic emulsions, the new dyes of the invention are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive materials. Methanols, isopropanol, pyridine, etc., alone or in combination have proven satisfactory as solvents for the majority of the new dyes of the invention. The type of silver halide emulsions that are sensitized with the new dyes include any of those prepared with hydrophilic colloids that are known to be satisfactory for dispersing light-sensitive silver halides, for example, emulsions prepared with hydrophilic colloids, such as natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, etc.

The concentration of the new dyes in the emulsion can be widely varied, i.e., generally from about 5 to about 100 mg. per liter of flowable emulsion. The specific concentration will vary according to the type of light-sensitive material in the emulsion and according to the effects desired. The most advantageous dye concentration for any given emulsion can be readily determined by making the tests and observations customarily used in the art of emulsion making. The emulsions are coated to advantage on any of the support materials commonly used for photographic elements, for example, paper, glass, cellulose derivatives, such as cellulose acetate, cellulose acetate-propionate, cellullose nitrate, etc., synthetic resins, such as polystyrene, poly(ethylene terephthalate) and other polyesters, polyamdies, such as nylon, and the like.

To prepare a gelatino-silver halide emulsion sensitized with one of the new dyes, the following procedure is satisfactory: A quantity of dye is dissolved in a suitable solvent, and a volume of this solution containing the desired amount of dye is slowly added with intimate mixing to about 1,000 cc. of light-sensitive gelatino-silver halide emulsion. With most of the new dyes, from about 10 to 20 mg. of dye per liter of emulsion suffices to produce the desired sensitizing effect with the ordinary gelatino-silver halides including silver chroride, bromide, bromoiodide, chlorobromide, chlorobromoiodide, etc. emulsions. With fine-grain emulsions which include most of the ordinary employed gelatino-silver chloride emulsions, somewhat larger concentrations of dye may be necessary to secure optimum sensitizing effect. While the preceding has dealt with emulsions comprising gelatin, it will be understood that these remarks apply generally to any emulsions in which a part or all of the gelatin is substituted by another suitable hydrophilic colloid such as previously mentioned.

The above statements are only illustrative and are not to be understood as limiting the invention in any sense, as it will be apparent that the new dyes can be incorporated by other methods in many of the emulsions customarily used in the art. For instance, in a less preferred method, the dyes can be incorporated by bathing a plate or film bearing an emulsion, in a solution of the dye.

Photographic silver halide emulsions, such as those listed above, containing the sensitizing dyes of the invention can also contain such addenda as chemical sensitizers, e.g., sulfur sensitizer (e.g., allyl thiocarbamide, thiourea, allylisothiocyanate, cystine, etc.), various gold compounds (e.g., potassium chloroaurate, auric trichloride, etc.) (see Baldsiefen U.S. Pat. 2,540,085, issued Feb. 6, 1951; Damschroder U.S. Pat. 2,597,856, issued May 27, 1952 and Yutzy et al. U.S. Pat. 2,597,915, issued May 27, 1952), various palladium compounds, such as palladium chloride (Baldsiefen U.S. Pat. 2,540,086, issued Feb. 6, 1951), potassium chloropalladate (Stauffer et al. U.S. Pat. 2,598,079, issued May 27, 1952), etc., or mixtures of such sensitizers; antifoggants, such as ammonium chloroplatinate (Trivelli et al. U.S. Pat. 2,566,245, issued Aug. 28, 1951), ammonium chloroplatinite (Trivelli et al. U.S. Pat. 2,566,263, issued Aug. 28, 1951), benzotriazole, nitrobenzimidazole, 5-nitroindazole, benzidine, mercaptans, etc. (see Mees "The Theory of the Photographic Process," MacMillan Pub., 1942, p. 460), or mixtures thereof; hardeners, such as formaldehyde (Miller U.S. Pat. 1,763,533, issued June 10, 1930), chrome alum (1,763,533), glyoxal (Brunken U.S. Pat. 1,870,354, issued Aug. 9, 1932), dibromacrolein (Block et al. British Pat. 406,750, accepted Mar. 8, 1934), etc.; color couplers, such as those described in Salminen et al. U.S. Pat. 2,423,730, issued July 7, 1947, Spence and Carroll U.S. Pat. 2,640,776, issued June 2, 1953, etc.; or mixtures of such addenda. Dispensing agents for color couplers, such as those set forth in Jelley et al. U.S. Pat. 2,322,027, issued June 15, 1943, and Mannes et al. U.S. Pat. 2,304,940, issued Dec. 15, 1942, can also be employed in the above described emulsions.

The invention has been described in detail with particular reference to preferred embodiments thereof but it will be understood that variations and modifications can be effected within the spirit and scope of the invention as described hereinabove and as defined in the appended claims.

We claim:
1. The cyanine dye 3-{bis[(1-ethylnaphtho[1,2-d]thiazoline-2-ylidene)-methyl]methylene} - 2,4 - chromandione.
2. The merocyanine dye 3-{(1-ethylnaphtho[1,2-d]thiazolin-2-ylidene)-1-methylethylidene] - 2,4 - chromandione.

References Cited

UNITED STATES PATENTS 2,739,964    3/1956    Brooker et al. _____ 260—240.1

OTHER REFERENCES

Jesthi et al., Indian J. Chem., vol. 3, pp. 461 to 462 (1965).

Hamer, The Cyanine Dyes and Related Compounds, pp. 644 to 645, Interscience Publishers, N.Y. (1964).

JOHN D. RANDOLPH, Primary Examiner

U.S. Cl. X.R.
96—106; 260—240.4